Oct. 1, 1968   J. A. BRIGHT ET AL   3,403,534
CONDENSATION CONTROL SYSTEM FOR HUMIDIFIED REFRIGERATOR
Filed Jan. 3, 1967   2 Sheets-Sheet 1

INVENTORS
James A. Bright &
John T. O'Connell
BY
J. C. Evans
ATTORNEY

Oct. 1, 1968   J. A. BRIGHT ETAL   3,403,534
CONDENSATION CONTROL SYSTEM FOR HUMIDIFIED REFRIGERATOR
Filed Jan. 3, 1967   2 Sheets-Sheet 2

INVENTORS
James A. Bright &
John J. O'Connell
BY
J. C. Evans
ATTORNEY

United States Patent Office 3,403,534
Patented Oct. 1, 1968

3,403,534
CONDENSATION CONTROL SYSTEM FOR
HUMIDIFIED REFRIGERATOR
James A. Bright, Miamisburg, and John J. O'Connell, Dayton, Ohio, assignors to General Motors Corporation, Detroit, Mich., a corporation of Delaware
Filed Jan. 3, 1967, Ser. No. 606,602
3 Claims. (Cl. 62—419)

ABSTRACT OF THE DISCLOSURE

In a preferred form, a domestic refrigerator having a sealed liner with air cooled walls defining a high humidity food storage compartment which is cooled by natural convection with the liner walls and by radiation of heat to the walls and wherein an uncooled liner top and air return duct direct air to a recirculating fan that discharges moisture laden air over chilled liner walls for condensing moisture thereon for drainage from the compartment.

This invention relates to domestic refrigerators having high humidity storage compartments with cold wall cooling means and more particularly to an improved system for preventing undesirable condensation within such high humidity compartments.

Domestic refrigerators at times include sealed liners defining a food storage compartment which is cooled by directing cold air over the outer surface of the liner rather than directly through the compartment into convective heat transfer with articles stored therein. In areas of high humidities and heavy usage an excess amount of moisture may be introduced into the compartment.

Accordingly, an object of the present invention is to improve domestic refrigerators of the type including a sealed, cold wall liner defining a high humidity compartment by the provision therein of means for producing an improved presettable fluid circulation within the compartment for preventing build-up moisture condensation on the underside of horizontal surfaces therein.

A further object of the present invention is to eliminate undersirable condensation within a high humidity refrigerator compartment having the temperature therein reduced by cold walls of a liner defining the compartment by the provision of a moisture controlling fluid circulation system interiorly of the compartment having fan means and associated duct means arranged to continuously recirculate air through the compartment and wherein vertical compartment walls are maintained cooler than the top wall to preferentially collect excessive compartment moisture.

A further object of the present invention is to prevent an undesirable accumulation of condensation in a refrigerator compartment defined by a sealed liner with cold walls for cooling the compartment by the provision therein of means for cooling the liner walls including a first circulating fluid stream directed from an upper edge downwardly across the outer surface of the walls of the compartment and a secondary circulating air stream within said compartment including means for passing air through the interior of the compartment first across a first warmer liner wall portion thence across a wall portion cooled by the first fluid stream below the temperature of the first liner wall.

Yet another object of the present invention is to improve humidity control systems of the type set forth in th preceeding object wherein the compartment includes an insulated, uncooled upper closure member and the secondary air circulation system includes an inlet duct member spaced adjacent said upper closure member, a fan for drawing air from the compartment between the upper closure member and duct member and a flow diverter for passing air from the fan downwardly across a rear wall of the compartment cooled by the exterior air stream for removing condensation from the interiorly circulating air stream; and wherein an inlet to the space between the upper closure member and duct member is located closely adjacent the upper edge of an access opening into the high humidity compartment.

Further objects and advantages of the present invention will be apparent from the following description, reference being had to the accompanying drawings wherein a preferred embodiment of the present invention is clearly shown.

Figure 1:
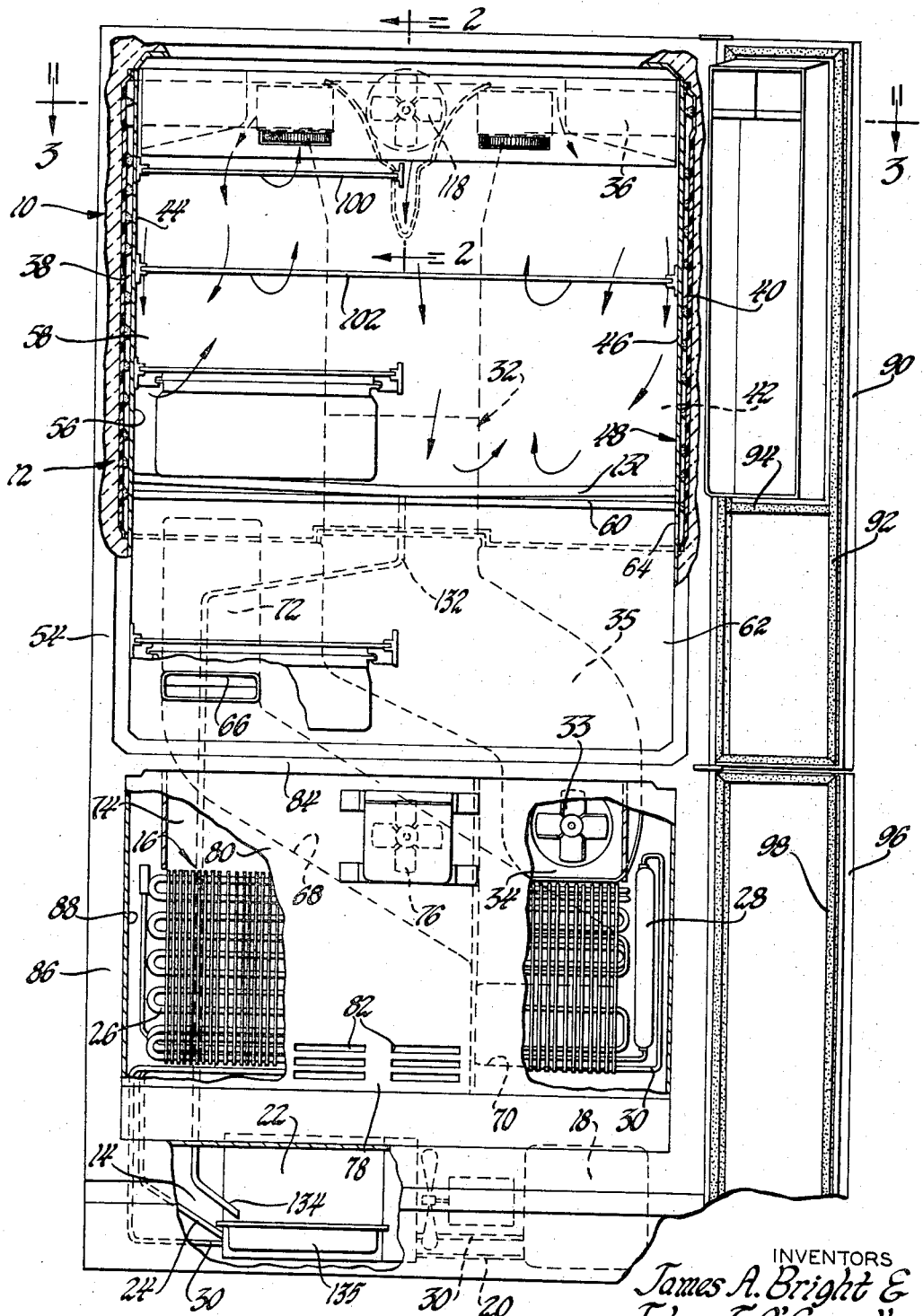
FIGURE 1 is a view in front elevation and partly in vertical section of a refrigerator including the present invention.

Referring now to the drawing, in FIGURE 1, a plural compartment refrigerator 10 is illustrated of the type more specifically set forth in copending United States application Ser. No. 606,999, Bright et al., filed Jan. 3, 1967. For purposes of describing the present invention, it is merely necessary to point out that the refrigerator includes an outer insulated cabinet 12 forming a machinery compartment 14. An evaporator 16 is supplied with refrigerant from a motor driven compressor unit 18 that discharges through a conduit 20 to a condenser 22 from whence refrigerant passes through an elongated capillary tube 24 which connects to one end of an evaporator coil 26. The opposite end of the evaporator coil is connected through an accumulator 28 thence through a return conduit 30 to the inlet of the compressor 18.

The refrigerator includes a first fluid circulating system 32 that utilizes a motor driven fan 33 for drawing air from a first cooled compartment 34 behind a first portion of the evaporator coil 26 thence to discharge a predetermined quantity of cooling air through a discharge duct 35 through an upwardly located split plenum 36 from whence cooling fluid is diverted through side passageways 38, 40 and a rear passageway 42 for cooling spaced apart side walls 44, 46 of an inner liner 48. The side walls 44, 46 are joined by a rear wall 50 and the inner liner 48 also includes a top closure member 52 joining the side walls 44, 46 and rear wall 50. The cabinet 12 has a front collar 54 thereon forming an access opening 56 into a high humidity compartment 58 that is sealed at its bottom by a divider shelf 60 from a flowing cold compartment 62 located therebelow. Air from the side passageways 38, 40 and rear passageways 42, flows through an opening 64 in the side wall 46 respectively, at a point below the divider wall 60 into and through the flowing cold compartment 62 from whence fluid is discharged through an outlet opening 66 for return through a diagonally and downwardly directed duct 8 communicating with an inlet opening 70 to the evaporator compartment 34. Part of the cooling air flow is directed around compartment 62 through a by-pass duct 72. For a better understanding of the above-mentioned air cooling circuit, reference may be had to the above mentioned Bright et al. application.

Additionally, the refrigerating apparatus 10 includes a low temperature evaporator compartment space 74 separate from the compartment 34 and in communication with the inlet to a motor driven freezer fan 76 that circulates air from the compartment 74 thence through a lower freezer compartment 78 which is separated from the evaporator space by a rear wall 80 having openings 82 therein from which air is returned to the cooling compartment 74. The motor driven fan 76 is operative to circulate freezer compartment air independent of that passing through the compartment 34 so as to maintain a predetermined below freezing temperature therein for example, in the range of −10° F. to 0° F.

In the illustrated arrangement, the freezer compartment 78 is separated from the flowing cold compartment 62 by an insulated divider wall 84 and a collar 86 which surrounds the front of the compartment 78 defines an access opening 88 thereto.

The access opening 56 closed by a door 90 having a sealing gasket 92 thereon throughout the periphery thereof which engages the collar 54. Likewise, the refrigerator door 90 is pivotally mounted on the cabinet 12 on one side thereof for movement to a closed position wherein a central sealing gasket 94 engages shelf 60 to seal the high humidity compartment 58 from the flowing cold compartment 62. A lower vertically pivoted door 96 with a peripheral seal 98 closes the freezer access opening 88.

One feature of the above described system is that the compartment 58 has no direct air flow therethrough. As a result, foods preserved therein retain a substantial moisture content and any humidity in the surrounding environment will be maintained in the compartment 58 when the door 94 is closed thereby to produce an elevated humidity in the compartment 58 as compared to that in the force draft cooled compartments 62 and 78.

The maintenance of high humidity in the sealed compartment 58 eliminates the need for covering leftovers and the like placed therein. In areas of high humidity and heavy usage an excessive amount of moisture may be introduced into compartment 58 causing a humidity condition in the sealed compartment 58 at times which can approach a 100% relative humidity condition. Such a saturated environment can present a problem which is manifested by the presence of substantial condensation on horizontal surfaces within the compartment 58 such as the illustrated shelves 100, 102. Such surfaces and the top closure of such high humidity compartments can have an undesirable condensation of moisture thereon which eventually collects and drips through the interior of the compartment 58 to produce a very undesirable clammy condition therein.

In accordance with certain of the principles of the present invention, the problem is obviated by means of a unique humidity control system that utilizes a controlled, presettable air circulation system for selectively drawing air at a predetermined flow rate through the high humidity compartment across a moisture removing surface including condensate collection and removal means and for sweeping air laterally across a horizontal surface within a high humidity compartment 58 for removing condensation therefrom.

Figure 2:
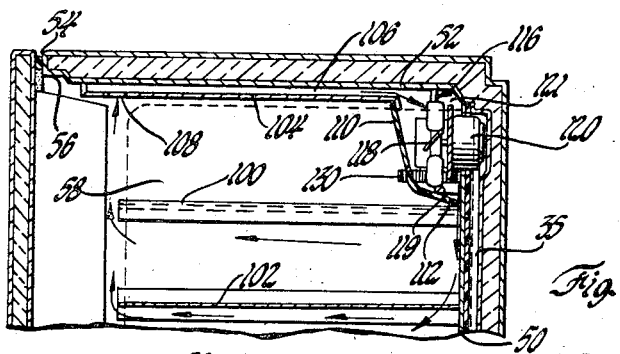
FIGURE 2 is a view in vertical section taken along the line 2—2 of FIGURE 1.
Figure 3:
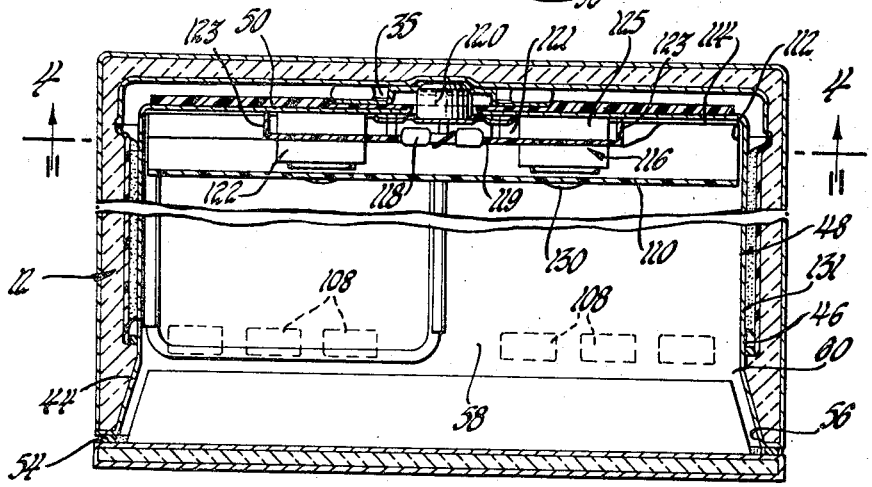
FIGURE 3 is a view in horizontal section taken along the line 3—3 of FIGURE 1.
Figure 4:
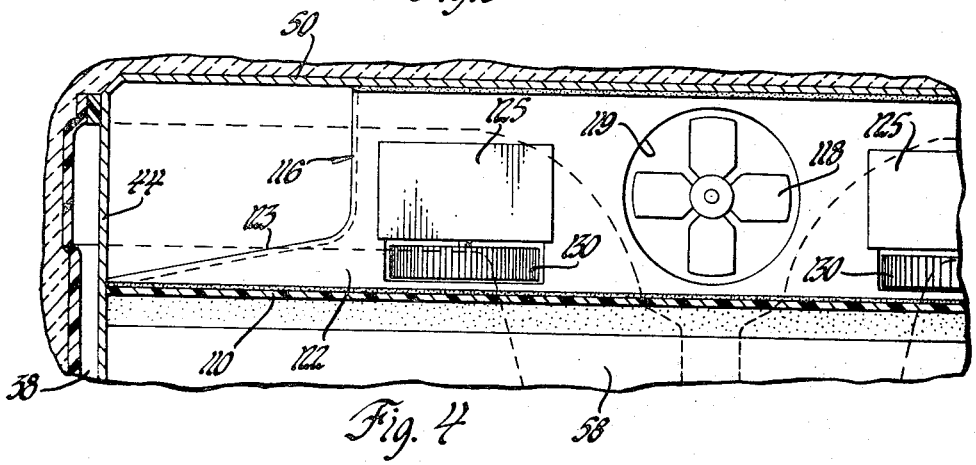
FIGURE 4 is an enlarged fragmentary sectional view taken along the line 4—4 of FIGURE 3.
Figure 5:
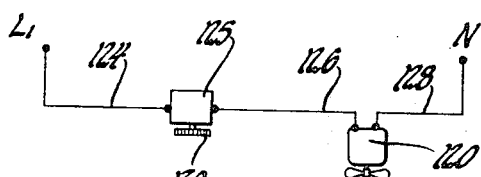
FIGURE 5 is a wiring diagram of a control circuit for use in the present invention.

More particularly, with reference to FIGURE 2 of the drawings, the upper closure member 52 has a duct member 104 located therebelow extending across the width of the top closure member 52 to form a passageway 106 communicating with the front upper region of the compartment 58 at a plurality of inlet openings 108. The duct member 104 at the rear edge thereof is joined to a downwardly depending light shield 110 that has a rear edge 112 thereon located in close spaced relationship with the rear liner wall 50 to form an elongated horizontal discharge opening 114 extending across the full width of the rear wall 50. Between the passageway 106 and the discharge opening 114 is located an orifice housing 116 having a fan 118 supported within an inlet opening 119 therein. A motor 120 directed outwardly through the rear wall 50 in direct heat transfer relationship with the inlet duct 35 to be cooled by air flow therethrough drives fan 118 to draw air from passageway 106 for discharge into a space 121 bounded by orifice housing 116. The housing 116 has a front wall 122 and side walls 123 that engage lower wall 50 and shield 112 to define space 121.

The fan motor 120 is connected in a motor energization circut from wire $L_1$ through a conductor 124 connected to one side of a solid state speed controller 125 of a type set forth more specifically in copending United States application Ser. No. 607,693, filed Jan. 6, 1967, to James A. Canter. This controller is electrically connected by conductor 126 to one side of the motor 120 having the opposite side thereof connected by a conductor 128 to wire N. The controller 125 includes a manually presettable dial 130 that is operative to preselect a predetermined fan operating speed that produces a closely regulated, predetermined amount of fluid flow from the compartment 58 which is drawn upwardly therefrom through the inlet openings 108 into the passageway 106 where the relatively moist air from the compartment 58 is warmed by member 52 so as to prevent condensation on the duct member 104. The fan 118 discharges the warmed air through the elongated discharge port 114 directly across the air-cooled rear wall 50 of the liner 48 to reduce the temperature of the circulating air stream to thereby cause a predetermined amount of the moisture content thereof to condense on the inner surface of the rear wall of the compartment 58 from whence the condensate flows downwardly to a collection trough 131 which is connected by a drain conduit 132 to condensate collection tube 134 communicating with a drain pan 135 within the machinery compartment of the refrigerator from whence moisture evaporates exteriorly of the refrigerator. As shown by solid arrows in FIGURE 1, part of the air flows over the cool side walls 44, 46 where moisture also condenses to be collected in side segments of trough 131.

By virtue of the illustrated embodiment, air discharged from the fan 118 and through the elongated discharge port 114 sweeps downwardly and outwardly through the compartment 58 so as to brush condensation from the shelves 100, 102 to further reduce any tendency for moisture dripping through the compartment 58.

While the illustrated arrangement tends to reduce the humidity level within the compartment 58 and also tends to accelerate deyhdration of articles therein, the speed of operation of the fan 118 can be closely regulated by the controller 125 in accordance with the humidity conditions in the environment around the refrigerator to maintain sufficient amount of humidity in the compartment 58 to prevent excessive drying while lowering the humidity content of the compartment 58 sufficiently to prevent excessive condensation on the horizontal surface therein.

While the embodiment of the present invention as herein disclosed constitutes a preferred form, it is to be understood that other forms might be adopted.

What is claimed is as follows:

1. In a refrigerating apparatus, the combination of liner means forming a sealed compartment having a rear wall, means for circulating a cooling air stream across the outer surface of said rear wall for cooling said compartment, means for controlling moisture condensation within said compartment including fan means located rearwardly of said compartment including motor means thereon located in air flow relationship with said cooling air stream for cooling said motor means, a duct for communicating said fan means with a front region of said compartment forwardly of said rear wall, means for directing air from said fan means downwardly across the rear wall for reducing the temperature of air being passed from said fan means to remove moisture therefrom, said duct having an inlet opening therein to produce flow from said rear wall forwardly thereof to sweep horizontal surfaces within said compartment to remove condensate from such surfaces for subsequent deposition on said rear wall.

2. In a refrigerating apparatus, the combination of means forming an above-freezing compartment including an inner liner having spaced apart side walls, a rear wall joining said spaced apart side walls, a top closure member joining said side and rear walls, means forming an access opening into said compartment, means for sealing said access opening to maintain a high humidity level within said compartment, means for circulating a cooling air stream across the exterior of said side and rear walls for reducing the temperature thereof, said top closure member being located out of direct convective heat transfer relationship with said cooling air stream, means for continuously circulating air interiorly within said compartment independent of the air flow across the outer surface of said walls including means for drawing air from a point forwardly and upwardly of said compartment thence across said top closure member thence downwardly across said cooled rear wall for condensing moisture from said interiorly circulating stream, said means including a discharge opening extending across said rear wall for sweeping said continuously circulated stream across said rear wall thence forwardly through said compartment for removing condensation from horizontal surfaces therein thereby to reduce drippage of moisture within said compartment.

3. In a refrigerating apparatus, the combination of means forming an above-freezing compartment including an inner liner having spaced apart side walls, a rear wall joining said spaced apart side walls, a top closure member joining said side and rear walls, means forming an access opening to maintain a high humidity level within said compartment, means for circulating a cooling air stream across the exterior of said side and rear walls for reducing the temperature thereof, said top closure member being located out of direct convective heat transfer relationship with said cooling air stream, means for continuously circulating air interiorly within said compartment independent of the air flow across the outer surface of said walls including means for drawing air from a point forwardly and upwardly of said compartment thence across said top closure member thence downwardly across said cooled rear wall for condensing moisture from said interiorly circulating stream, said means including a discharge opening extending across said rear wall for sweeping said continuously circulated stream across said rear wall thence forwardly through said compartment for removing condensation from horizontal surfaces therein thereby to reduce drippage of moisture within said compartment, said means for circulating fluid within said high humidity compartment including a fan, motor means for driving said fan, means for varying the speed of operation of said fan including presettable user control means, said fan having a continuous speed of operation following setting of said user control means to maintain a continuous air flow pattern within said high humidity compartment sufficient to prevent undesirable condensation of moisture on horizontal surfaces within said high humidity compartment.

References Cited
UNITED STATES PATENTS

| | | | |
|---|---|---|---|
| 2,107,400 | 2/1938 | Stabbal | 62—405 |
| 2,285,945 | 6/1942 | Rundell | 62—405 |
| 2,866,323 | 12/1958 | Candor | 62—419 X |

WILLAM J. WYE, *Primary Examiner.*